US012637205B2

(12) United States Patent  
 Chauhan

(10) Patent No.: US 12,637,205 B2  
(45) Date of Patent: May 26, 2026

(54) AIRCRAFT LANDING GEAR TORQUE LINK ASSEMBLY

(71) Applicant: SAFRAN LANDING SYSTEMS UK LTD, Gloucester (GB)

(72) Inventor: Manish Chauhan, Cheltenham (GB)

(73) Assignee: Safran Landing Systems UK Limited (GB)

( * ) Notice: Subject to any disclaimer, the term of this patent is extended or adjusted under 35 U.S.C. 154(b) by 477 days.

(21) Appl. No.: 18/283,315

(22) PCT Filed: Mar. 3, 2022

(86) PCT No.: PCT/GB2022/050567  
§ 371 (c)(1),  
(2) Date: Sep. 21, 2023

(87) PCT Pub. No.: WO2022/200764  
PCT Pub. Date: Sep. 29, 2022

(65) Prior Publication Data  
US 2024/0174352 A1    May 30, 2024

(30) Foreign Application Priority Data

Mar. 24, 2021    (GB) ...................................... 2104123

(51) Int. Cl.  
*B64C 25/50* (2006.01)  
*B64C 25/34* (2006.01)  
*B64D 45/00* (2006.01)

(52) U.S. Cl.  
CPC ............ *B64C 25/505* (2013.01); *B64D 45/00* (2013.01); *B64D 2045/0085* (2013.01)

(58) Field of Classification Search  
CPC ....... B64C 25/505; B64C 25/34; B64C 25/50; B64D 45/00; B64D 2045/0085  
See application file for complete search history.

(56) References Cited

U.S. PATENT DOCUMENTS 2,367,993 A  *  1/1945  Bishop .................. B64C 25/505  
                                                  244/103 W  
3,499,621 A    3/1970  Boehringer et al.  
(Continued)

FOREIGN PATENT DOCUMENTS

CA        3071504 A1    4/2020  
CN      101519120 A      9/2009  
(Continued)

OTHER PUBLICATIONS

Office Action (The First Office Action) with Search Report issued Sep. 5, 2025, by the National Intellectual Property Administration, P. R. China in corresponding Chinese Patent Application No. 202280024531.7 and an English translation of the Office Action. (10 pages).

(Continued)

*Primary Examiner* — Robert A. Siconolfi  
*Assistant Examiner* — James K Hsiao  
(74) *Attorney, Agent, or Firm* — Buchanan Ingersoll & Rooney PC

(57) ABSTRACT

A torque link assembly for an aircraft landing gear comprising: an upper torque link; a lower torque link; a joint pin arranged to pivotally couple the upper torque link and lower torque link; an electric motor assembly; a sensor arranged to detect movement of the upper torque link or lower torque link and in response to detecting the movement providing a control signal to the electric motor assembly, wherein the electric motor assembly is configured to linearly translate the joint pin with respect to one of the upper or lower torque links.

11 Claims, 4 Drawing Sheets

(56) References Cited

U.S. PATENT DOCUMENTS

| RE27,450 E | * | 8/1972 | Boehringer et al. | .... | B64C 25/32 |
| | | | | | 188/306 |
| 6,120,009 A | * | 9/2000 | Gatehouse | .............. | B64C 25/60 |
| | | | | | 267/64.11 |
| 8,042,765 B1 | * | 10/2011 | Nance | ................ | B64D 45/0005 |
| | | | | | 244/100 R |
| 9,499,261 B2 | * | 11/2016 | Narayan | ................. | B64C 25/34 |
| 10,006,785 B1 | * | 6/2018 | Cahill | ................... | B60T 13/662 |
| 10,059,464 B2 | * | 8/2018 | Clarke | ................... | G01B 11/14 |
| 10,974,821 B2 | * | 4/2021 | Nguyen | ................. | B64C 25/505 |
| 11,235,887 B2 | * | 2/2022 | Thompson | .............. | B64C 25/34 |
| 11,273,929 B2 | * | 3/2022 | Georgin | ................... | B64C 25/60 |
| 12,054,282 B2 | * | 8/2024 | Trevisan | ................... | G01L 5/00 |
| 2003/0029684 A1 | | 2/2003 | Förster | | |
| 2007/0235585 A1 | * | 10/2007 | Nance | .................... | G01G 19/07 |
| | | | | | 244/100 R |
| 2010/0288878 A1 | * | 11/2010 | Bennett | ................... | B64C 25/58 |
| | | | | | 702/50 |
| 2011/0297786 A1 | * | 12/2011 | Sweet | ................... | B64C 25/405 |
| | | | | | 244/103 R |
| 2012/0232723 A1 | * | 9/2012 | Nance | .................... | B64C 25/00 |
| | | | | | 701/5 |
| 2013/0114089 A1 | * | 5/2013 | Jarisch | .................... | G01B 7/14 |
| | | | | | 356/614 |
| 2015/0041585 A1 | * | 2/2015 | Holloway | ............... | B64C 25/28 |
| | | | | | 73/488 |
| 2015/0267769 A1 | * | 9/2015 | Fazeli | .................... | G01F 22/02 |
| | | | | | 701/29.5 |
| 2015/0344150 A1 | * | 12/2015 | Duncan | .................... | B64F 5/60 |
| | | | | | 267/195 |
| 2016/0207615 A1 | | 7/2016 | Narayan | | |
| 2017/0233096 A1 | * | 8/2017 | Clarke | ............... | B64D 45/0005 |
| | | | | | 356/617 |
| 2018/0086439 A1 | * | 3/2018 | Thompson | ............. | B64D 45/00 |
| 2018/0086440 A1 | * | 3/2018 | Nguyen | ............. | B64C 25/505 |
| 2018/0170527 A1 | * | 6/2018 | Roques | ................... | B64C 25/42 |
| 2018/0304999 A1 | * | 10/2018 | Schmidt | .................. | B64C 25/42 |
| 2019/0002092 A1 | * | 1/2019 | Thompson | ............. | F16F 9/3292 |
| 2019/0002123 A1 | * | 1/2019 | Thompson | ............. | B64D 45/04 |
| 2019/0016319 A1 | * | 1/2019 | Thompson | ............. | B64C 25/34 |
| 2019/0291854 A1 | | 9/2019 | Amberg et al. | | |
| 2021/0300534 A1 | * | 9/2021 | Dong | ..................... | B64C 27/16 |
| 2024/0174352 A1 | * | 5/2024 | Chauhan | .............. | B64C 25/505 |

FOREIGN PATENT DOCUMENTS

| CN | 110294110 A | 10/2019 |
| EP | 3156326 A2 | 4/2017 |
| EP | 3428063 A1 | 1/2019 |
| GB | 650878 A | 3/1951 |

OTHER PUBLICATIONS

Great Britain Search Report for Great Britain Application No. GB2104123.1, dated Jul. 30, 2021, 4 pages.
International Search Report and Written Opinion for International Application No. PCT/GB2022/050567, dated May 12, 2022, 12 pages.

* cited by examiner

AIRCRAFT LANDING GEAR TORQUE LINK ASSEMBLY

This application is a U.S. National Phase application of PCT International Application No. PCT/GB2022/050567, filed Mar. 3, 2022, which claims the benefit of GB 2104123.1, filed Mar. 24, 2021, both of which are incorporated by reference herein.

BACKGROUND

During landing, take-off, and taxiing, aircraft landing gear can be subject to an oscillation about the shock strut axis. This oscillation is known as a shimmy oscillation and can be influenced by a number of factors such as unbalanced wheels, uneven surface, unequal tire pressure, a new-old tire combination, torque link joint wear, and, lack of forward rake or aft trail. Without dampening the shimmy oscillation, the vibration can travel from the landing gear to other structures of the aircraft.

Currently, shimmy oscillations are addressed through the use of friction dampeners, hydraulic dampeners, or a combination of both. These dampeners are passive systems and can require pre-set friction and damping values.

However, the present inventors have identified that hydraulic dampeners have an increased risk of fluid leakages and high maintenance levels. Moreover, friction type dampeners are often restricted to smaller aircraft and are limited by a high degree of wear and tear leading to the need for regular maintenance. Thus, there is a need for an active system to provide reliable, low-maintenance dampening.

SUMMARY

According to a first aspect of the present invention there is provided a torque link assembly for an aircraft landing gear comprising: an upper torque link; a lower torque link; a joint pin arranged to pivotally couple the upper torque link and lower torque link; an electric motor assembly; a sensor arranged to detect movement of the upper torque link or lower torque link and in response to detecting the movement providing a control signal to the electric motor assembly, wherein the electric motor assembly is configured to linearly translate the joint pin with respect to one of the upper or lower torque links.

When vibration from the wheel assembly causes a shimmy event, the vibrations can travel through the lower torque link to the upper torque link, passing through a joint pin connecting the lower and upper torque links. The present inventors have found that it is advantageous to use the joint pin to restrict the vibrations from travelling from the lower torque link to the upper torque link. For example, by using a sensor to monitor the movement of the lower or upper torque link, an accurate measure of the magnitude of the vibration in the lower or upper torque link can be obtained. The vibration measurement can then be relayed to an electric motor which can operate to exert a force on the joint pin to dampen the vibrations and restrict vibrations reaching other sections of the aircraft. By actively controlling a shimmy event, the likelihood of damaged parts due to excessive vibration is reduced, leading to less frequent maintenance and longer lifetimes of parts. The use of an electric motor is advantageous over known hydraulic dampeners as electric motors can achieve a higher response rate when compared to hydraulic systems.

The electric motor can be fixed relative to one of the upper or lower torque links. This arrangement can allow the sensor system to be integrated into the electric motor and the fixed torque link. Vibration can then be monitored relative to the fixed portion.

The electric motor can be fixed relative to the lower torque link. When the electric motor is fixed relative to the lower torque link, the sensor can be attached to the motor and monitor a sensor target on the lower torque link. As the shimmy events originate from the wheel assembly, they will travel through the lower torque link before the upper torque link. By monitoring the lower torque link, vibrations can be controlled before they reach further assemblies, including the upper torque link.

The electric motor assembly can comprise one or more solenoid motors. This can allow the joint pin of the torque link assembly to be motorised to produce precise motion in response to a signal. The advantage of a solenoid motor is that the system can be relatively simple to construct whilst having a fast transition speed from an on and off position.

The solenoid motor can be a linear solenoid actuator type. This can allow for an efficient method of producing linear motion of the joint pin.

The joint pin can comprise an outer sleeve which comprises a ferromagnetic material.

As a force will be exerted on ferromagnetic material within the magnetic field produced by the solenoid motor, the moving part is required to comprise a ferromagnetic material. Ferromagnetic material can be considerably dense, for example, it is common to use an iron core, or slug, within a solenoid motor. Therefore, the present inventors have found that a joint pin made of a lightweight material that is non-ferromagnetic can be formed with a ferromagnetic component, such as an outer sleeve. The magnetic field can exert a force on the outer sleeve which will in turn exert a force on the joint pin.

The motor assembly can include one or more belleville washers. This arrangement can allow for smaller vibrations to be dampened that may not be registered by the sensor or of high enough magnitude to require the electric motor to be activated.

The motor can be arranged to maintain the force on the joint pin until the vibrations are below a threshold. This can allow the assembly to dampen the vibrations and maintain the dampened state until the shimmy event has been reduced to acceptable levels.

The torque link assembly can further comprise a health monitoring system arranged to record the duration and magnitude of a shimmy vibration event.

The health monitoring system can be arranged to record the duration and magnitude of the force applied to the joint pin by the electric motor.

This health and monitoring system can provide reliable data about the vibrations present during landing gear use. The data can be stored and/or transmitted to a central database for monitoring the shimmy events. The data can be used to assist in determining the wear of the components and provides a general health monitoring system for evaluating potential damage caused by shimmy events.

BRIEF DESCRIPTION OF THE DRAWINGS

Embodiments of the invention will now be described, by way of example only, with reference to the accompanying drawings, of which.

DETAILED DESCRIPTION OF THE DRAWINGS

Figure 1:
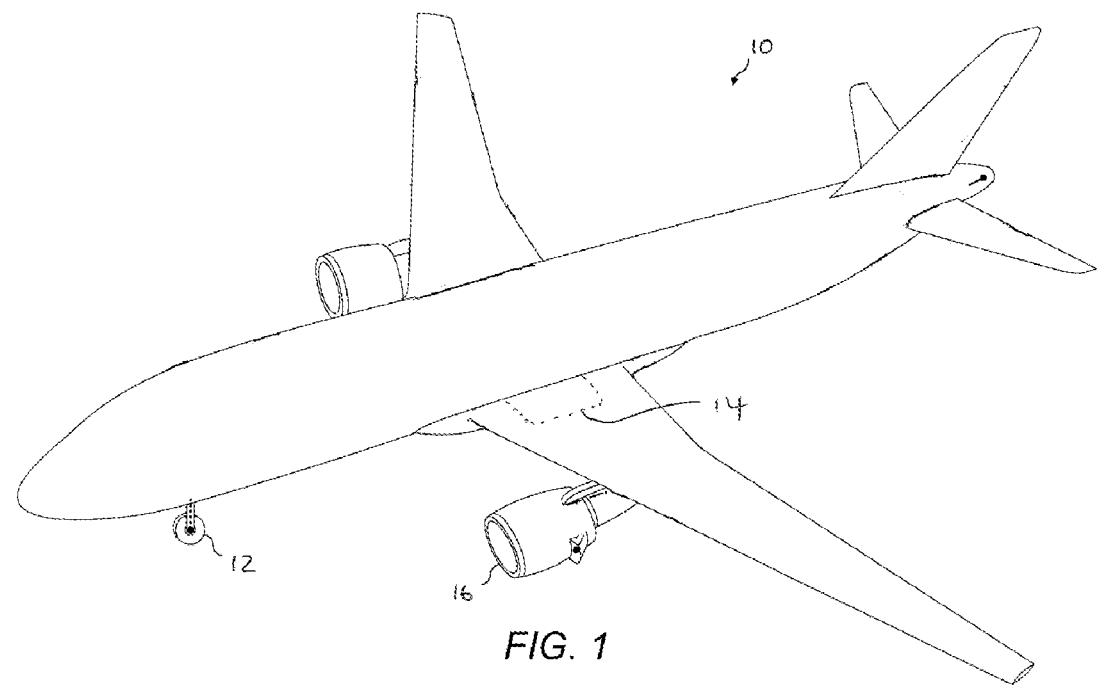
FIG. 1 is a schematic drawing of an aircraft according to an embodiment of the invention.

FIG. 1 is a diagram of an aircraft 10. The aircraft 10 includes subassemblies such as a nose landing gear 12, main landing gear 14 and engines 16. Other aircraft subassemblies will be apparent to the skilled person. A subassembly can be a group of interconnected parts which are arranged to be fitted to the aircraft as a unit.

Figure 2:
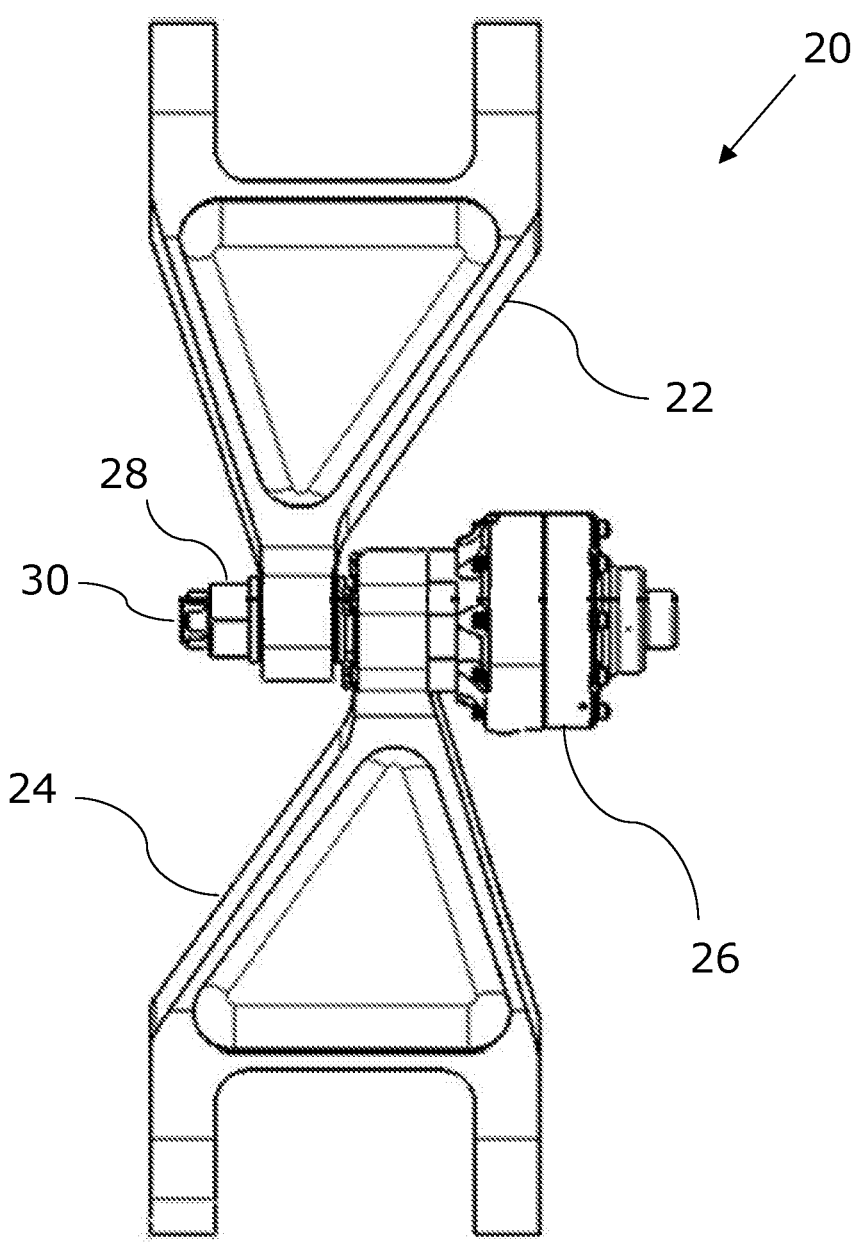
FIG. 2 is a schematic diagram of a torque link according to an embodiment of the invention.

Referring now to FIG. 2, an aircraft subassembly, namely a torque link of an aircraft landing gear assembly 12, 14, is shown generally at 20. The torque link includes an upper torque link 22 and a lower torque link 24, connected by a pivoting joint. The lower torque link 24 can connect to the sliding tube of the landing gear shock absorber (not shown) and the upper torque link 22 can connect to the outer housing, or cylinder, of the landing gear shock absorber. The pivoting joint can be formed by a joint pin 30 arranged to pass through a lug on each of the upper 22 and lower 24 torque links, arranged about a longitudinal axis of the joint pin 30. As shown, the upper 22 and lower 24 torque links can each extend away from the joint pin 30. The joint pin 30 is also connected to a shimmy dampener system 26. The shimmy dampener system 26 defines an annulus surrounding a region of the joint pin 30. The torque link assembly 20 can be secured by a nut 28 at the free end of the pin 30. The upper 22 and lower 24 torque links can be connected to the joint pin via bushings.

Figure 3:
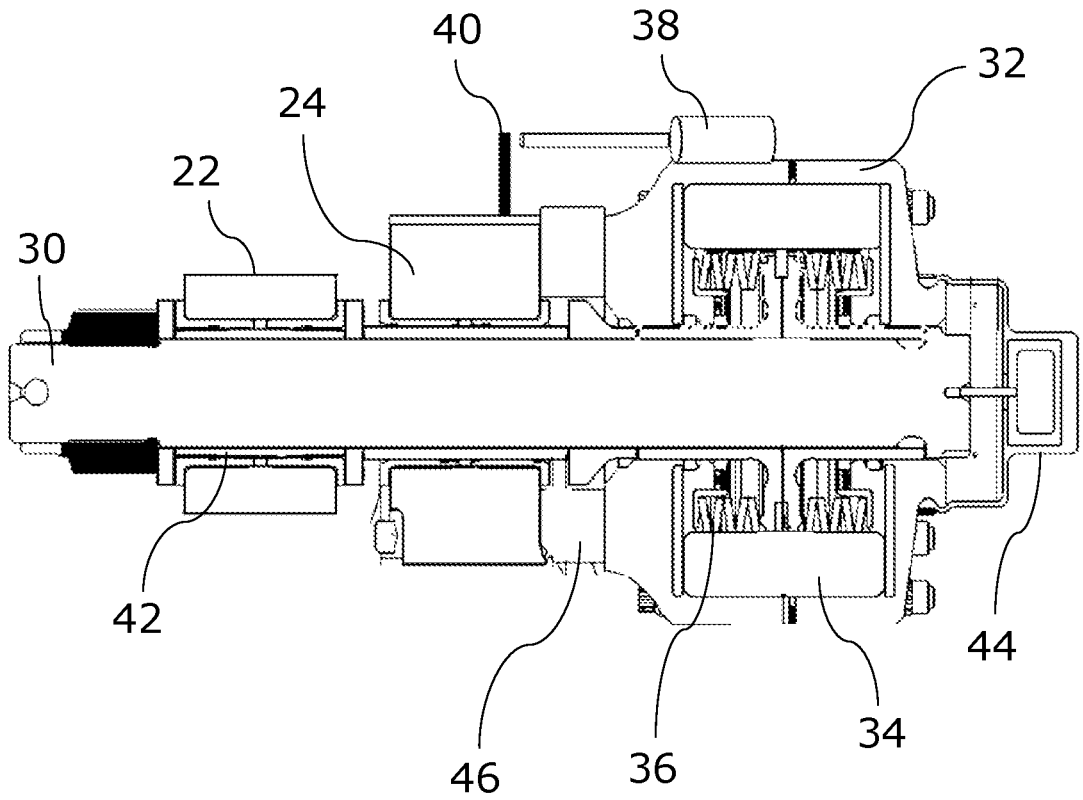
FIG. 3 is a further schematic diagram of the torque link according to an embodiment of the invention.

Referring additionally to FIG. 3, a cross section of the shimmy dampener system 26 is shown. The shimmy dampener system 26 comprises a casing 32 which houses an electric motor 34, such as a solenoid motor. The casing 32 may also house a series of Belleville washers 36. The casing 32 and electric motor 34 define an annulus arranged to surround a region of the joint pin 30. The casing 32 is arranged coaxially and adjacent to the lower torque link 24, about the longitudinal axis of the joint pin 30. The casing 32 may be spaced from the lower torque link 24 via a washer 46 and secured to the lower torque link 24 via a bolt or any other suitable means. The upper torque link 22 is arranged coaxially and adjacent to the lower torque link 24, about the longitudinal axis of the joint pin 30. The upper torque link 22 is arranged to move freely in a lateral motion with respect to the lower torque link 24. In this arrangement, the upper torque link 22 may be fixed relative to the joint pin 30.

The casing 32 can further comprise a sensor 38, arranged to detect movement of the lower torque link 24 via a sensor target 40 arranged on the lower torque link 24. The sensor arrangement can be any suitable means of detecting vibration or varying distances, such as an accelerometer or a laser assembly.

The shimmy event assembly 26 may further comprise a health monitoring system 44 arranged to record the vibration data.

The joint pin 30 is arranged to pass through at least the casing 32, the lower torque link 24, and the upper torque link 22. The joint pin 30 thus arranges these components about the longitudinal axis of the pin. The joint pin may comprise an outer sleeve 42 which is fixed with respect to the pin. The outer sleeve 42 is illustrated in segments as the sleeve 42 can be formed of connecting parts which enables an efficient means for the pin 30 and sleeve 42 construction.

Figures 4A, 4B, 4C:
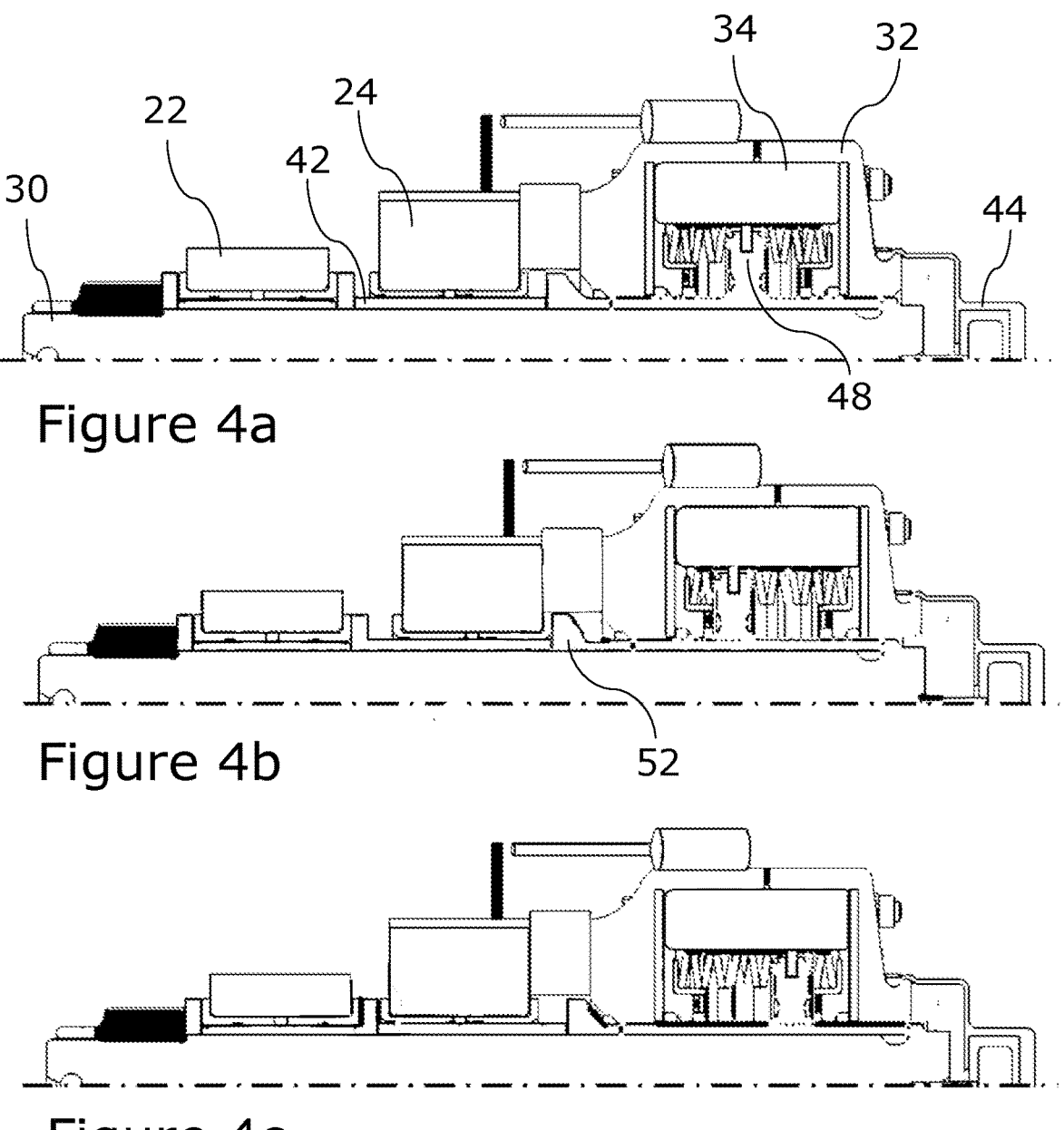
FIGS. 4*a*, 4*b* and 4*c* are further schematic diagrams of the torque link according to an embodiment of the invention.

Referring additionally to FIGS. 4*a-c*, a partial cross section of the shimmy dampener system 26 is shown. Features equivalent to those shown in FIG. 3 have equivalent reference numerals to that of FIG. 3. Vibrations, such as those originating at the wheel assembly can travel to the lower torque link 24 and cause a shimmy event. If left undamped, these oscillations can propagate to further parts of the aircraft 10. The sensor 38 detects the magnitude of vibrations in the lower torque link 24. Once the vibrations have reached a predetermined level, such as a maximum acceptable vibration level, the electric motor 34 initiates and applies a force to the joint pin 30. The sensor 38 can provide feedback to the electric motor 34 to initiate the force or the electric motor 34 can comprise an algorithm to determine, based on the sensor data gathered, whether the frequency and/or magnitude of the vibrations is above the threshold limit.

As the joint pin 30 can be fixed with respect to the upper torque link 22 but free to move with respect to the casing 32 and lower torque link 24, the force on the joint pin 30 will result in the upper torque link 22 moving coaxially closer to or further away from the lower torque link 24. By adjusting the position of the upper torque link 22 with respect to the lower torque link 24, the shimmy event can be dampened. Specifically, by closing any gap between the upper 22 and lower 24 torque links, the vibrations can be reduced until they are within the predetermined threshold. This dampens the vibrations to reduce how far the shimmy event can travel to other assemblies of the aircraft 10.

The electric motor 34 can be a linear solenoid actuator type. In this arrangement, the motor comprises a coil of wire (not shown) which surrounds the joint pin 30. When the vibrations are detected as being at or above the acceptable threshold, the solenoid motor 34 provides current to the coil of wire, creating a magnetic field. The strength of the magnetic field is influenced by the current in the wire meaning that the magnetic field strength can be accurately controlled. The magnetic field will exert a force on ferromagnetic material and thus an object comprising ferromagnetic material will be pushed into or pulled out of the coil of wire, depending on the current in the wire. By forming the joint pin or sleeve 30, 42 of, at least partially, a ferromagnetic material the joint pin 30 can be moved by the motor 32 inducing a current through the coil surrounding the pin 30.

Typical ferromagnetic material includes iron, nickel, and cobalt. As iron, for example, is particularly dense, it can be advantageous to form the joint pin 30 of a more lightweight material and provide a ferromagnetic outer sleeve 42. The core of the joint pin 30 can thus be formed of a material such as titanium alloy, whilst the outer sleeve 42 fixed to the core of the pin 30 can comprise a ferromagnetic material or an alloy of such material.

In this arrangement, the joint pin 30 is moved by the force exerted on it from the outer sleeve 42, which is moving under force provided by the magnetic field. Therefore, the upper torque link 22 which is fixed relative to the joint pin 30, will move closer or further from the lower torque link 24, based on the current in the wire.

Alternatively, the electric motor can be a conventional brush motor, brushless motor, or stepper motor providing rotational movement that can be converted to linear motion of the joint pin by convention means such a rack & pinion or worm gear.

FIG. 4*a* shows an arrangement in which the joint pin 30 is in a central position. This can be achieved when the motor 34 is inactive or at a mid-point during a shimmy event. The casing 32 can comprise a protrusion 48 which extends radially away from the joint pin 30, towards the electric motor 34. The protrusion 48 can be surrounded by Belleville washers 36 arranged coaxially adjacent to the protrusion 48. When in the central position, the Belleville washers 36 are approximately equal in compression either side of the protrusion 48.

FIG. 4*b* shows an arrangement in which the joint pin 30 is an extreme left position. Here, the joint pin 30 has been pushed away from the casing 32 until a region on the outer sleeve 42 of the joint pin 30 formed a mechanical stop 52 by abutting the lower torque link 24. The outer sleeve 42 can comprise further protrusions to form a mechanical stop with components surrounding the joint pin 30. A mechanical stop can define a maximum displacement of the joint pin 30.

As the protrusion 48 on the outer sleeve 42 will move with the joint pin 30, the Belleville washers 36 on the side of the protrusion 48 closest to the torque links 22, 24 will compress. The Belleville washers 36 on the opposing side of the protrusion 48 will relax to at least partially fill the space produced.

FIG. 4*c* shows an arrangement in which the joint pin 30 is in an extreme right position. Here, the joint pin 30 has been pulled towards the casing 32 so that the upper 22 and lower 24 torque links are pulled closer together. The first protrusion 48 is thus pulled towards the casing 32 closer to the enclosed end of the joint pin 30, compressing the Belleville washers 36 on the side of the enclosed end of the joint pin 30. A mechanical stop is provided by the upper 22 and lower 24 torque link assemblies abutting.

In an alternative embodiment, a combination of electric motors 34 can be used. For example, two electric motors concentric to each other or two electric motors in series. By increasing the number of motors and adjusting positions of the motors, the intensity of the dampening force can be adjusted.

The joint pin 30 can further comprise a health monitoring system 44. The health monitoring system 44 can be arranged at an end of the joint pin 30, such as the end closest to the casing 32 along the longitudinal axis, as shown in FIGS. 3 and 4*a-c*. The health monitoring system 44 can be arranged to detect and record the magnitude and duration of joint pin 30 movement which can be indicative of the magnitude and duration of a shimmy event. The data gathered can then be stored or relayed to a central database to record shimmy events occurring in the landing gear assembly 12, 14. Reoccurring shimmy events can indicate that parts of the assembly are fatiguing and require maintenance. Alternatively, the health monitoring system 44 can be integrated into overall shock strut health monitoring system (not shown).

As will be appreciated by the skilled person, the invention can also be achieved by alternatively arranging the shimmy dampener system to fix the upper torque link to the casing and fix the lower torque link with respect to the pin. In this embodiment, the vibrations causing the shimmy event can be detected and the lower torque link moved with the pin, relative to the upper torque link.

The invention claimed is:

1. A torque link assembly for an aircraft landing gear comprising:
   an upper torque link;
   a lower torque link;
   a joint pin arranged to pivotally couple the upper torque link and lower torque link;
   an electric motor assembly; and
   a sensor arranged to detect movement of the upper torque link or lower torque link and, in response to detecting the movement, provide a control signal to the electric motor assembly,
   wherein the electric motor assembly is configured to linearly translate the joint pin with respect to one of the upper or lower torque links.

2. The torque link assembly according to claim 1, wherein the electric motor is fixed relative to one of the upper or lower torque links.

3. The torque link assembly according to claim 2, wherein the electric motor is fixed relative to the lower torque link.

4. The torque link assembly according to claim 1, wherein the electric motor assembly comprises one or more solenoid motors.

5. The torque link assembly according to claim 4, wherein the solenoid motor is a linear solenoid actuator type.

6. The torque link assembly according to claim 1, wherein the joint pin comprises an outer sleeve which comprises ferromagnetic material.

7. The torque link assembly according to claim 1, wherein the motor assembly includes one or more Belleville washers.

8. The torque link assembly according to claim 1, wherein the motor is configured to evaluate a vibration magnitude based on the movement, and maintain the force on the joint pin until the vibration magnitude is below a threshold.

9. The torque link assembly according to claim 1, further comprising a health monitoring system arranged to record the duration and magnitude of a shimmy vibration event based on the movement.

10. The torque link assembly according to claim 9, wherein the health monitoring system is arranged to record a duration and magnitude of the force applied to the joint pin by the electric motor.

11. An aircraft landing gear assembly including the torque link assembly of claim 1.

* * * * *